Figure 1:
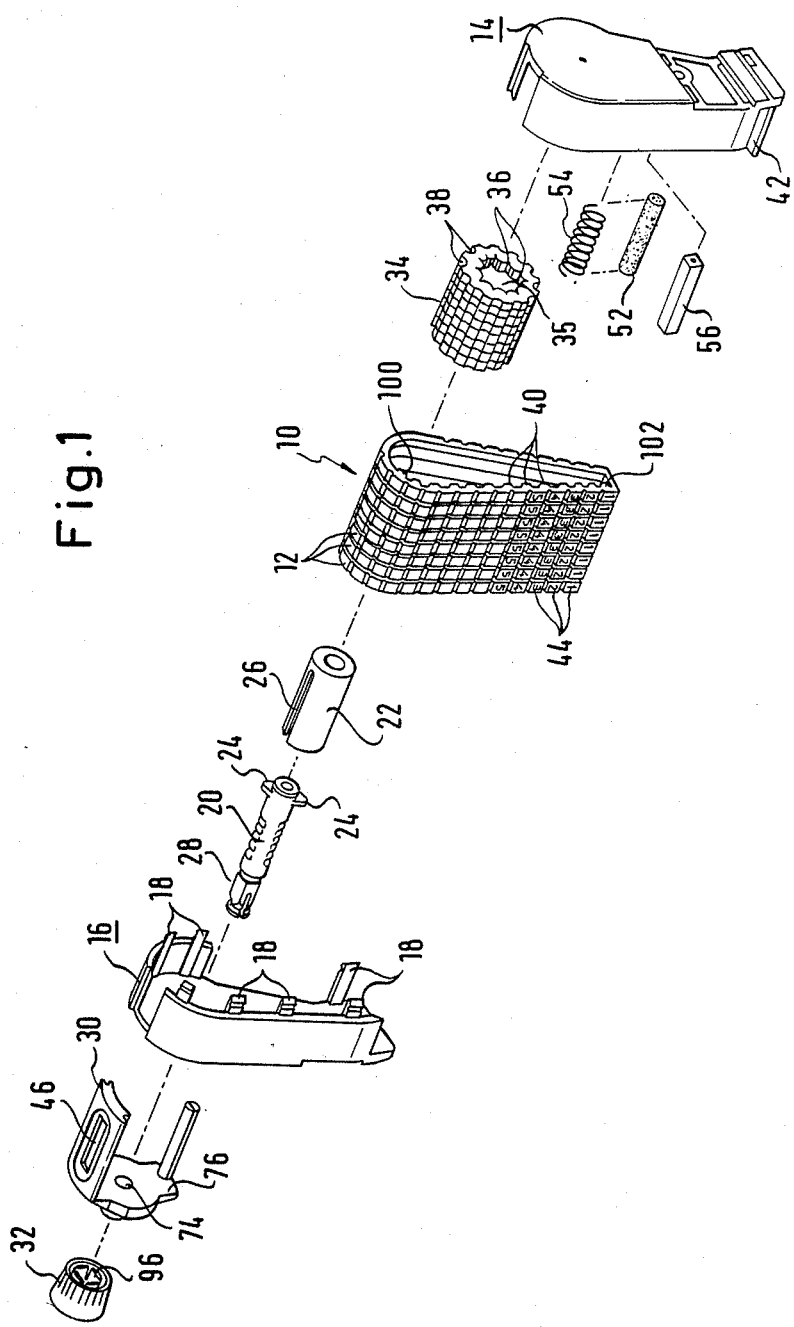

United States Patent [19]

Volk et al.

[11] Patent Number: 4,802,409

[45] Date of Patent: * Feb. 7, 1989

[54] PRINTING MECHANISM WITH TORQUE LIMITING DETENT ELEMENTS ON ACTUATING KNOB

[75] Inventors: Heinrich Volk, Beerfelden-Gammelsbach; Ulf Koch, Eberbach, both of Fed. Rep. of Germany

[73] Assignee: Esselte Meto International GmbH, Fed. Rep. of Germany

[*] Notice: The portion of the term of this patent subsequent to May 17, 2005 has been disclaimed.

[21] Appl. No.: 934,036

[22] Filed: Nov. 24, 1986

[30] Foreign Application Priority Data

Oct. 21, 1986 [DE] Fed. Rep. of Germany ....... 3635733

[51] Int. Cl.⁴ .............................................. B41J 1/20
[52] U.S. Cl. .................................... 101/111; 101/105
[58] Field of Search ................. 101/111, 105; 464/37, 464/41

[56] References Cited

U.S. PATENT DOCUMENTS

| | | | |
|---|---|---|---|
| 1,092,574 | 4/1914 | Jansson | 464/37 |
| 4,583,457 | 4/1986 | Volk | 101/111 |
| 4,584,938 | 4/1986 | Karn | 101/111 |
| 4,662,276 | 5/1987 | Schrutz | 101/111 |

FOREIGN PATENT DOCUMENTS 2064435 6/1981 United Kingdom ............... 101/111

Primary Examiner—Edgar S. Burr
Assistant Examiner—James Lisehora
Attorney, Agent, or Firm—Gerald J. Ferguson, Jr.

[57] ABSTRACT

A printing mechanism is described comprising a plurality of type carriers (12, 34) which on their outer peripheral face carry in one region printing types and in another region indicator types (44). The printing types can be brought into a printing position by turning the type carriers (12, 34). A setting means (32, 20, 24) including an actuating knob (32) can be brought into a drive connection with each of the type carriers (12, 34) for rotation thereof. Stop means (100, 102, 104, 106, 110) limit the turning travel of the type carriers (12, 34). Detent elements (96) hold the actuating knob against rotation relative to the type carrier (12, 34) which is in drive connection with the setting means (32, 20, 24), with a detent moment governed by the spring hardness of the detent elements. The spring hardness and thus the detent moment are determined so that when a moment is applied greater than the detent moment, rotation is permitted between the actuation knob and the type carrier, and when a moment is applied, there is no relative rotation between the actuation knob and the type carrier, and the type carrier is turned.

13 Claims, 7 Drawing Sheets

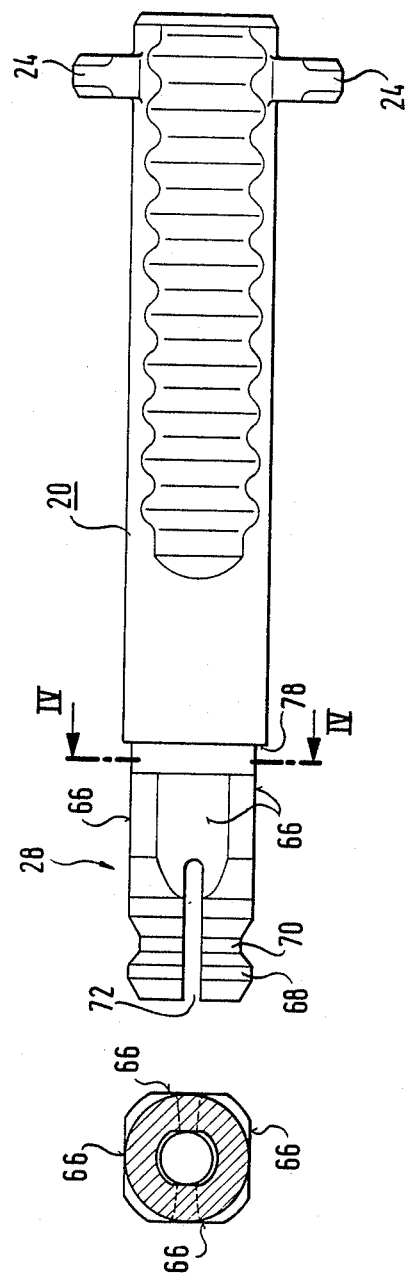

PRINTING MECHANISM WITH TORQUE LIMITING DETENT ELEMENTS ON ACTUATING KNOB

The invention relates to a printing mechanism comprising a plurality of type carriers which at their outer peripheral face carry in one region printing types and in another region indicator types, the printing types being adapted by turning the type carriers to be brought into a printing position, a setting means which includes an actuating knob and which by axial displacement can be brought into a drive connection with each of the type carriers for rotation thereof and stop means for limiting the turning travel of the type carriers.

Such a printing mechanism is known from DE-PS No. 3,406,762. In this known printing mechanism the stop means prevent the type carriers being turned by rotation of the setting knob and the setting shaft connected thereto to such an extent that the indicator types reach the printing position and in this position come into contact with the printing ink. This would greatly impair the good legibility of the indicator types. It has been found in practice that stop means frequently do not prevent the operator from attempting by applying high force to move the type carriers beyond the end position defined by the stop means. This can possibly result in damage to the printing mechanism. To prevent this, in the known printing mechanism between a setting shaft and an actuating knob mounted thereon a slip coupling is provided which slips and prevents further turning of the type carriers and of the particular type carrier coupled thereto as soon as the torque transmitted by the actuating knob to the setting shaft is greater than the torque necessary for turning the type carriers. As a result, when the stop means become operative the actuating knob slips on the setting shaft so that application of a greater force by the operator cannot have any damaging effects on the printing mechanism.

In the known printing mechanism the limit torque at which the slippage of the slip coupling or clutch starts is defined by the cooperation of the material of the actuating knob and the fit with which the actuating knob is mounted on the setting shaft. It has been found that the exact maintenance of the limit torque leads to difficulties because it requires high constancy of the material properties of the actuating knob. Also, factors on which the printing mechanism manufacturer has no influence can affect the limit torque; for example, the limit torque is drastically reduced when oil gets onto the setting shaft. In this case it may for example be reduced to such an extent that normal adjustment of the type carriers is no longer possible because the actuating knob slips on the setting shaft as soon as the adjusting torque is applied.

The invention is based on the problem of providing a printing mechanism in which the components for transmitting the torque required to adjust the type carriers can be made with larger tolerances both as regards the dimensions and as regards the material properties whilst maintaining a limit torque hardly affected by environmental conditions.

This problem is solved according to the invention by resilient detent elements which with a detent moment which is governed by their spring hardness and which is greater than the torque necessary for turning the type carriers hold the actuating knob against rotation relatively to the type carrier in drive connection with the setting means.

In the printing mechanism according to the invention the detent elements define the limit torque which can be transmitted by their spring hardness which can be fixed in the production. It is not necessary to select specific materials with properties to be observed exactly. The detent force exerted by the detent elements is not appreciably influenced by environmental influences, for example soiling, so that the limit torque which can be transmitted remains constant even over relatively long periods of time.

Advantageous further developments of the invention are characterized in the subsidiary claims.

In the solution characterized in claim 11 the detent elements defining the limit torque are disposed in a region in the interior of the printing mechanism in which they are particularly well protected against environmental influences so that a very good long-term constancy of the limit torque is achieved.

Figure 2:
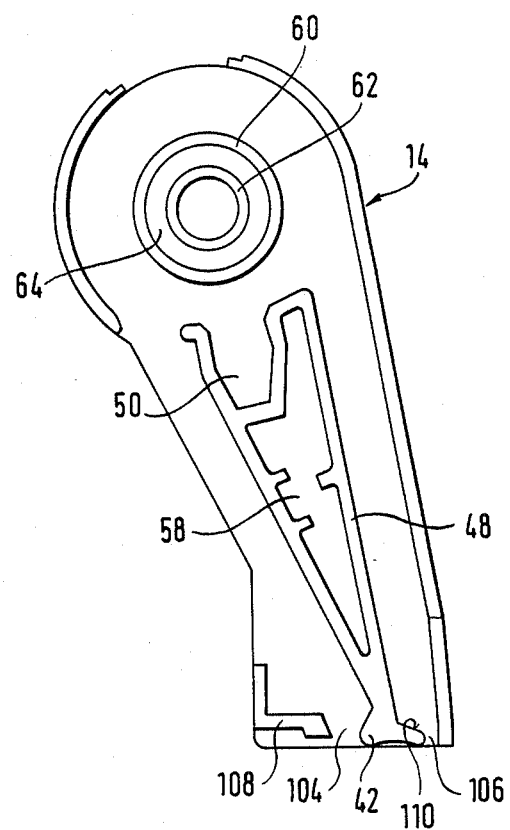
Figure 5:
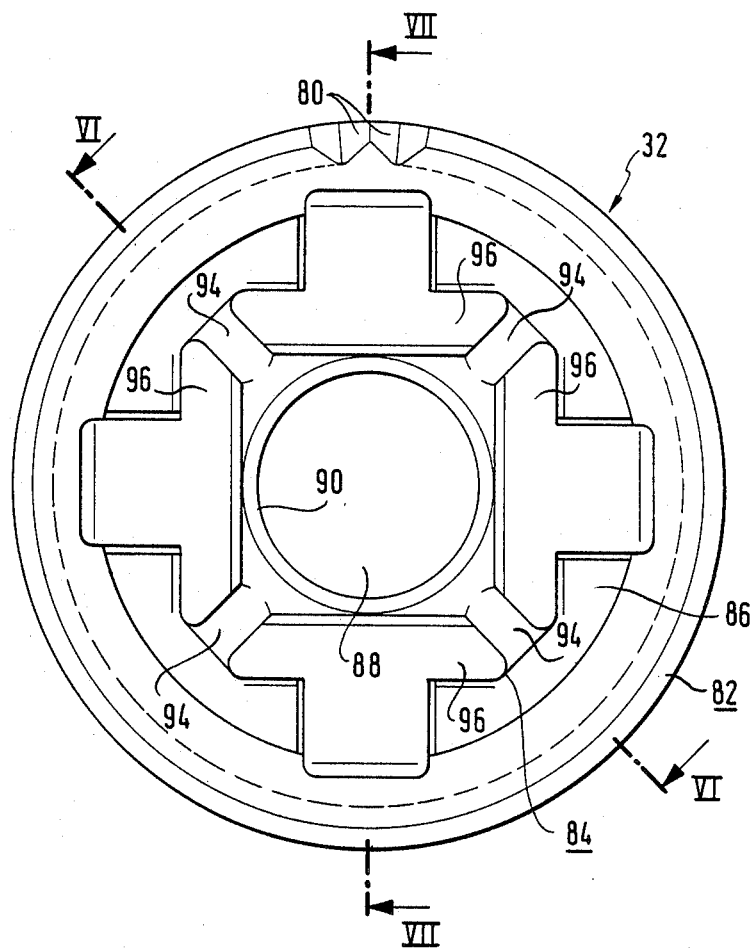
Figure 6:
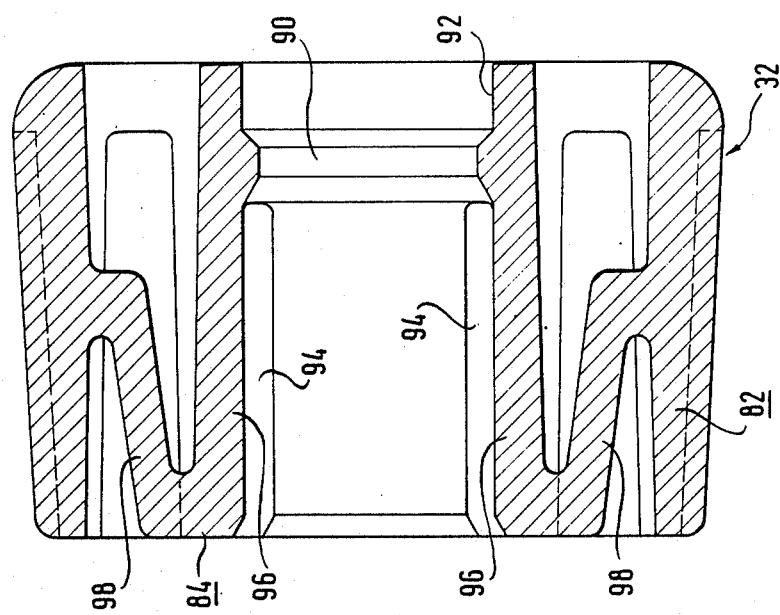
Figure 7:
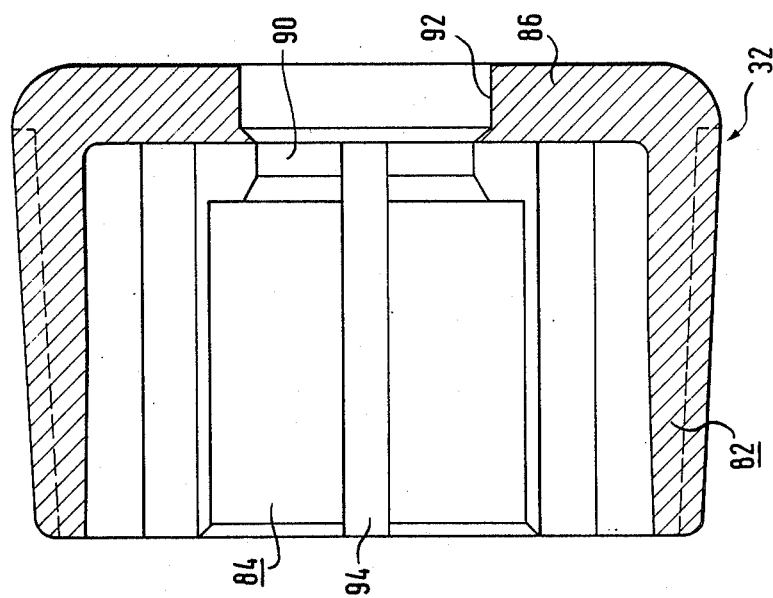
Figure 8:
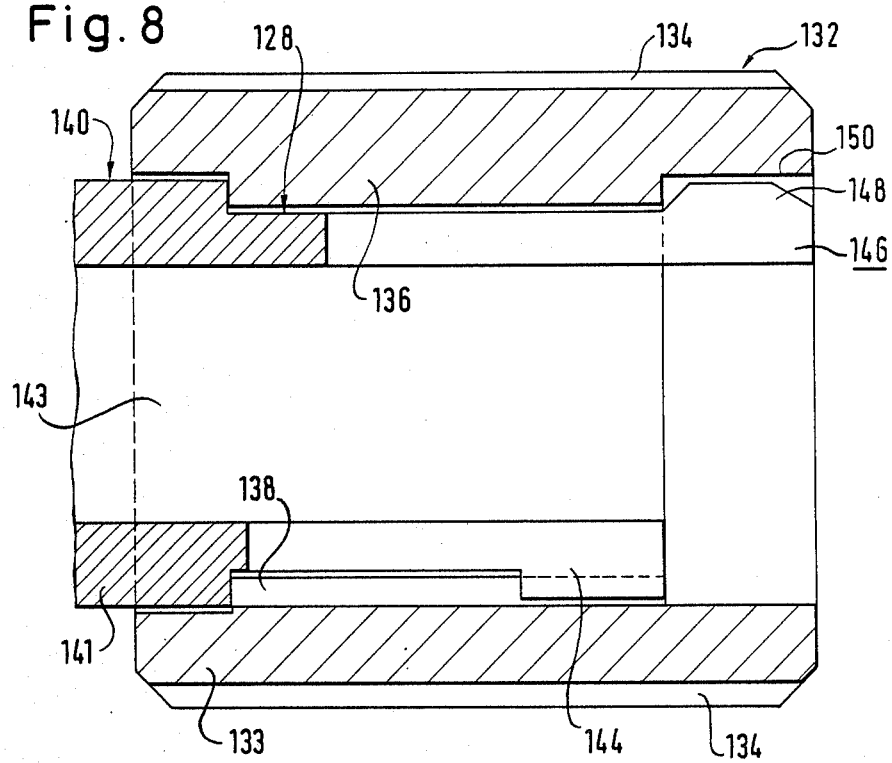
Figure 9:
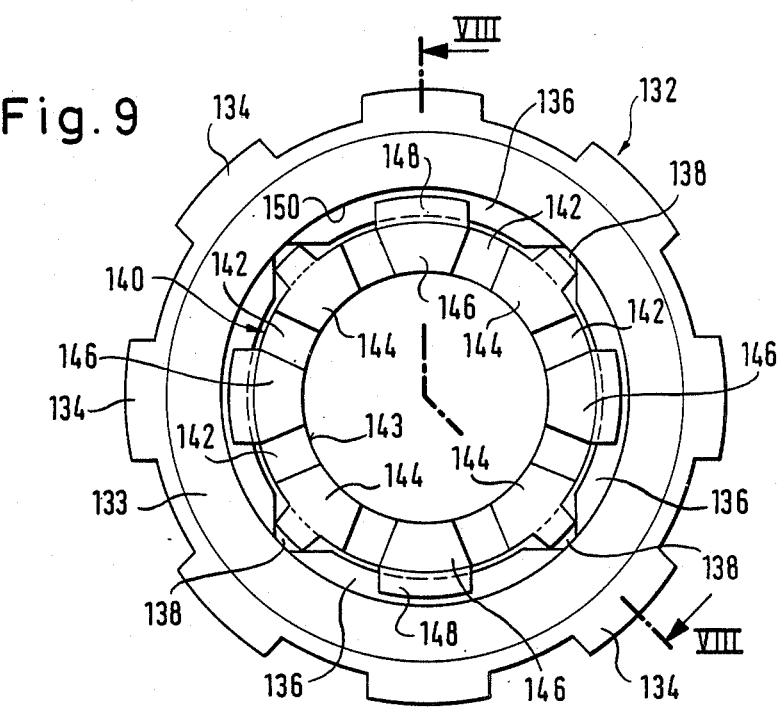
Figure 10:
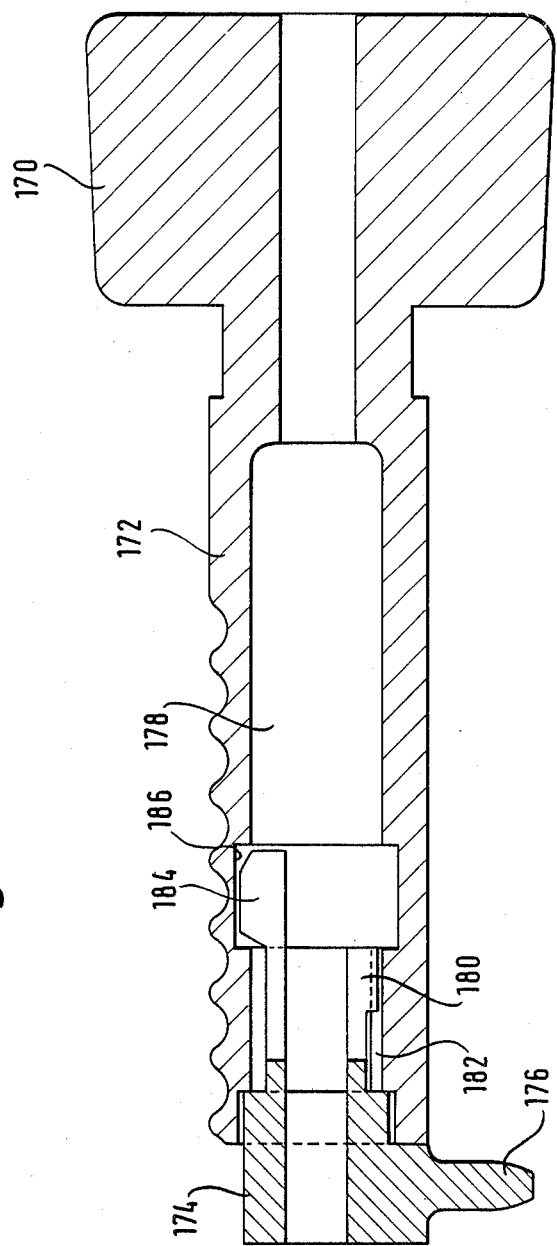

The invention will now be explained by way of example with reference to the drawings, wherein:

FIG. 1 is an exploded view of a printing mechanism according to the invention,

FIG. 2 is an inner view of the right housing half of the printing mechanism of FIG. 1, FIG. 3 is a view of the setting shaft for adjusting the type carriers, FIG. 4 is a section along the line A—A of FIG. 3, FIG. 5 is a view of the actuating knob in the illustration of FIG. 1 seen from the right side, FIG. 6 is a section along the line B—B of FIG. 5, FIG. 7 is a section along the line C—C of FIG. 5, FIG. 8 is an axial section through an actuating knob pushed onto the end of a setting shaft along the line D—D in FIG. 9 in a modified embodiment, FIG. 9 is a view of the actuating knob and the end of the setting shaft in the embodiment of FIG. 8 from the right side and FIG. 10 is an axial section through the actuating knob, the setting shaft and a driver carrier in a further embodiment of the invention.

The printing mechanism 10 illustrated in FIG. 1 is a stamp printing mechanism in which type bands 12 are used as type carriers. The printing mechanism includes two housing halves 14 and 16 which can be connected together by snap hooks 18. In the housing half 16 a setting shaft 20 is rotatably mounted over which the slit sleeve 22 is pushed. Drivers 24 formed at the end of the setting shaft 20 engage through slots 26 in the sleeve 22 beyond the outer periphery thereof. On the end region 28 of the setting shaft 20 there is a window support 30 and an actuating knob 32 with the aid of which the setting shaft 20 can be turned and axially displaced. On displacement of the setting shaft 20 the window support 30 is also axially displaced and the drivers 24 slide axially along the slots 26 in the sleeve 22. Mounted on the sleeve 22 are setting wheels 34 which at their inner peripheral face surrounding a central opening 35 have grooves 36 into which the drivers 24 of the setting shaft 20 engage. By axial displacement of the setting shaft 20 the drivers 24 can be brought into engagement with grooves 36 of a setting wheel 34. In this manner by turning the actuating knob 32 in succession each of the setting wheels 34 can be turned. The setting wheels 34 are also provided at their outer peripheral face with grooves 38 into which engage projections 40 disposed on the inner peripheral face of the type bands 12. In this manner the type bands 12 can be moved via the engagement between the drivers 24 and the grooves 36 and the engagement between the grooves 38 and the projections 40. In the printing mechanism the type bands 12 are led round the setting wheels 34 and also engage round a printing web 42 located at the lower end face of the housing half 14 and serving as deflection edge for the type bands 12. The printing type which happens to be under the printing web 42 in the particular setting of the type bands 12 generates the desired imprint in each case. In this connection it is pointed out that on the type bands 12 in FIG. 1 only some of the indicator types are represented; the printing types are on the back, not visible in FIG. 1, of the type carrier set formed by the type carriers 12. The visible indicator types 44 and the associated printing types are disposed on the type bands 12 in such a manner than whenever a printing type is located beneath the printing web 42 in the printing position the corresponding indicator type is visible through a window 46 in the window support 30. In this manner it is always apparent through the window 46 which particular printing types are located in the printing position beneath the printing web 42.

According to FIG. 2 the printing web 42 is disposed integrally on the lower end of a support element 48 connected to the housing half 14. At its upper end the support element 48 has a recess 50 in which in the assembled state of the printing mechanism a rubber strip 52 and thereabove a helical spring 54 are disposed. The rubber strip 52 and the helical spring 54 have together a height such that the helical spring 54 projects upwardly out of the recess 50 and comes into contact with the setting wheels 34 arranged thereabove. The helical spring 54 exerts a limited holding force on the setting wheels which opposes the rotation thereof. When a setting wheel 34 is turned by turning the setting shaft 20 by means of the actuating knob 32 the operator feels a detent force which must be overcome every time a type band 12 is to be adjusted stepwise so that one printing type after the other comes to lie beneath the printing web 42.

By means of a square member 56 inserted into a recess 58 in the support element 48 and having a width corresponding to the internal width of the two housing halves 14, 16, the stamp printing mechanism can for example be screwed to a printing mechanism support of a hand labeling device. The corresponding screws not shown in FIG. 2 can be inserted through holes in the housing halves 14, 16 and screwed into threaded bores in the ends of the square member 56.

For mounting the sleeve 22 in the housing half 14 two annular collars 60, 62 are provided whose radial spacing forms a recess 64, the radial dimension of which is equal to the wall thickness of the sleeve 22 so that the latter can be inserted into the recess and held by the annular collars 60 and 62. The inner annular collar 62 engages on the inside into the sleeve 22 whilst the outer annular collar 60 engages the sleeve 22 on the outside. The two annular collars have only a slight axial extent so that in each case they secure only the end of the sleeve 22 furthest to the right in FIG. 1.

In FIG. 3 the setting shaft of the printing mechanism of FIG. 1 is shown in an enlarged view. the end region 28 of the setting shaft 20 destined to receive the actuating knob 32 has a partially square cross-section with rounded corners resulting in four detent faces 66. Directly at the end the setting shaft 20 comprises a bead 68 and an adjoining peripheral groove 70. A diametrical slot 72 formed in the end region 28 of the setting shaft 20 provides a certain elasticity of said end region and yieldability of the bead 68. The bead 68 and the peripheral groove 70 serve to firmly secure the actuating knob 32 pushed onto the end region 28 without said knob having to be secured with the aid of additional means. The manner in which this securing is effected will become apparent hereinafter from the description of the form of the actuating knob.

In the assembled state the end region 28 of the setting shaft 20 projects through an opening 74 in one side plate 76 of the window support 30, the step 78 on the setting shaft 20 acting as stop preventing a further insertion of the setting shaft 20 into the opening 74. The portion of the end region 28 having the square cross-section projects out of the opening 74 in the side plate 76 to the left in the view of FIG. 1 so that the actuating knob 32 can be pushed onto the end region.

According to FIGS. 5, 6 and 7 the actuating knob 32 is made slightly conical at its outer peripheral face to facilitate gripping and operation. To increase the grip the outer peripheral face is knurled which is indicated in FIG. 5 for simplicity of the drawings only by means of two knurl grooves 80. The actuating knob 32 comprises an outer sleeve 82 and an inner sleeve 84 which is connected to the outer sleeve 82 at the end face of the actuating knob 32. The inner sleeve 84 surrounds an inner cavity 88 which in the region of the end face 84 has a constriction in the form of an annular bead 90. When the actuating knob 32 is pushed onto the setting shaft the annular bead 90, utilizing the yieldability provided by the slot 72, compresses the bead 68 until the annular bead 90 slides into the peripheral groove 70. The bead 68 then comes to lie in the widened portion 92 in the actuating knob 32 so that said knob is firmly held on the setting shaft 20.

The inner sleeve 84 of the actuating knob 32 has a substantially square cross-section as apparent in FIG. 5. At the corners of the square form slots 94 are formed in the axial direction so that four axially extending detent fingers 96 result which when the actuating knob 32 is pushed onto the end region 28 of the setting shaft 20 come to bear against the detent faces 66. If no resistance torque opposes the turning of the setting shaft 20 the latter can be turned by means of the pushed-on actuating knob 32 due to the cooperation of the detent fingers 96 with the detent faces 66. Because of the presence of the slots 94 the detent fingers 96 can be deflected in the radial direction and act as springs having a specific spring hardness. This spring hardness is defined by the material and the constructional configuration of the detent fingers.

FIG. 7 shows that the free ends of the detent fingers 96 are connected via connecting webs 98 to the outer sleeve, the point at which the connecting webs are joined to the outer sleeve 82 lying substantially in the centre of the longitudinal extent of the outer sleeve 82. These connecting webs increase the spring hardness of the detent fingers but otherwise have no influence on the detent fingers 96 behaving like leaf springs clamped at one end.

As mentioned, the actuating knob 32 pushed onto the setting shaft 20 entrains said shaft on rotation as long as no resistance moment opposes the rotation of the setting shaft 20. The printing mechanism of FIG. 1 is however so designed that the type bands 12 on rotation of the setting shaft 20 can execute only a predetermined adjustment travel, any further rotation being opposed by a very large resistance moment. This large resistance moment is produced by providing on the inner peripheral face of the type bands 12 projections 100 and 102 which are so dimensioned that they do not pass through a gap 106 between the printing web 42 and the wall of the housing 14 or a gap between the printing web 42 and a stop web 108 connected to the housing 14. The two projections 100 and 102 thus limit the adjustment travel of the type bands in both adjustment directions so that although all the printing types can be moved to a position beneath the printing web 42 the indicator types 44 associated with the printing types cannot reach this position. Thus, when a type band has been adjusted to such an extent that the projection 100 has come to bear on the upper edge 110 of the printing web 42 the resistance moment opposing the further rotation increases greatly. The spring hardness of the detent fingers 96 is so dimensioned that in this situation a deflection of the spring fingers 96 radially outwardly occurs so that the detent force exerted by the detent fingers 96 is overcome and the actuating knob 32 slips on the end region 28 of the setting shaft 20. In this manner any damage to the printing mechanism by forced further rotation of the actuating knob 32 is prevented.

In the other direction of rotation the projection 102 leads to the great increase in the resistance moment.

FIGS. 8 and 9 show a further embodiment of the actuating knob and the setting shaft end region cooperating therewith. The actuating knob 132 has the form of a hollow cylinder whose wall 133 is provided on its outer peripheral face with projections 134 to improve the grip. In a centre region on the inner peripheral face of the cylindrical wall 133 of the actuating knob 132 projections 136 and detent grooves 138 therebetween are disposed.

The end region 128 of the setting shaft 140 receiving the actuating knob 132 comprises in its cylindrical wall 141 surrounding an axial passage 143 eight slots 142 resulting in a total of eight axially extending detent elements. Four of these detent elements form detent fingers 144 whilst four further detent elements each between every two adjacent detent fingers 144 form locking hooks 146. As apparent in FIG. 8 the detent fingers 144 and the locking hooks 146 each have a different axial extent, the locking hooks extending up to the end face of the actuating knob 132 lying on the right in FIG. 8 whilst the detent fingers 144 only project to the right as far as the projections 136 also extend to the right.

The detent fingers 144 have the same effect as the detent fingers 96 in the embodiment described above. They prevent a free rotation of the actuating knob 132 on the end region 128 of the setting shaft 140. Because of their spring hardness these detent fingers 144 oppose the rotation of the actuating knob 132 relatively to the setting shaft 140 with a detent force which must first be overcome to permit relative rotation. The spring hardness of the detent fingers 144 is so dimensioned that the relative rotation of the actuating knob 132 with respect to the setting shaft 140 does not occur until the resistance moment produced by the type bands 12 is greater than the torque to be applied for a normal adjustment of the type bands. As in the example of embodiment described above this is the case when one of the projections 100 or 102 runs against the upper edge of the printing web 42. Only then will the actuating knob 132 slip on the end region 128 of the setting shaft 140, the detent fingers 144 being deflected radially inwardly by the projections 136. In this manner on application of a torque lying above the limit torque damage to the printing mechanism is prevented.

The locking hooks 146 lie according to FIG. 8 with their radially outwardly directed teeth 148 in a peripheral groove which is formed in the end of the cylinder wall of the actuating knob 132 on the right in FIG. 8. When the actuating knob 132 is pushed onto the setting shaft 140 the locking hooks 148 are deflected radially inwardly until they come into the region of the groove 150 whereupon they again assume the position illustrated in FIG. 8. In this position the teeth 148 prevent the actuating knob 132 from being easily removed from the setting shaft 140. The locking hooks 146 thus secure the actuating knob 132 on the setting shaft 140.

In the two embodiments described by the constructional forms of the actuating knobs described and of the end regions of the setting shafts it is ensured that the actuating knob is held securely on the associated setting shaft and can only be turned relatively to the setting shaft when a specific limit torque is exceeded.

In the embodiment illustrated in FIG. 10 the means limiting the torque which can be transferred to the type carriers is not disposed between the actuating knob 170 and the setting shaft 172 but between the end of the latter remote from the actuating knob 170 and an additional component, that is a driver support 174 which carries the drivers 176 which engage into grooves in the inner peripheral faces of the setting wheels 34.

The driver support 174 is adapted to be inserted into the axial passage 178 of the setting shaft 172 and is provided with resilient detent fingers 180 which engage into detent grooves 182 formed in the inner peripheral face of the axial passage 178 of the setting shaft 172.

The driver support 174 further comprises resilient locking hooks 184 which engage in a peripheral groove 186 formed in the inner peripheral face of the axial passage 178.

The particular configuration of the driver support 174 thus achieves that by acting on the actuating knob 170 only a specific torque can be transmitted to the particular type carriers in engagement with the driver 176 so that damage of the printing mechanism by applying an excessive torque after the engagement of the stop means limiting the adjustment travel of the type carriers is prevented.

We claim:

1. A printing mechanism comprising:
   a plurality of type carriers carrying printing types in one peripheral region and indictor type in another peripheral region, the printing types are brought into a printing position by turning the type carriers;
   a setting means including an actuating knob, a setting shaft operably connected to said actuating knob and a driver means for turning the type carriers in response to turning of said setting shaft, said setting means being axially displaceable to be brought into a drive connection with each of the type carriers for rotation therewith;
   stop means provided at the type carriers for limiting the turning travel of the type carriers;
   said actuating knob is connected to said setting shaft by way of a torque limiting means which permits said actuating knob to rotate relative to said setting shaft when the torque necessary to turn a type carrier is greater than a predetermined slip torque, but provides a direct connection below said predetermined slip torque, said torque limiting means comprising resilient detent elements operatively connected to one of said actuating knob and said setting shaft for engaging a shaped means on the other of said actuating knob and said setting shaft, said predetermined slip torque is governed by the spring hardness of said resilient detent elements and is greater than the force necessary to turn the type carriers and less than the force resulting from the effect of said stop means.

2. The printing mechanism of claim 1, wherein said detent elements are provided as an integral part of one of said actuating knob and an end region of said setting shaft carrying said actuating knob, said setting shaft extending axially through central openings in the type carriers.

3. Printing mechanism according to claim 2, characterized in that the detent elements are axially extending detent fingers (96) which are disposed on the actuating knob and which are in engagement with detent faces (66) of said shaped means on the setting shaft (20).

4. Printing mechanism according to claim 3, characterized in that the actuating knob (32) consists of an outer sleeve (82) and an inner sleeve (84) connected thereto at an end wall (86) of the actuating knob (32), that the inner sleeve (84) is provided with axial slots (94) to form the detent fingers (96), that said shaped means on a portion of the end region (28) of the setting shaft (20) receiving the actuating knob (32) is in cross-section a polygon whose side faces form said detent faces (66), the number of detent faces (66) being equal to the number of the detent fingers (96).

5. Printing mechanism according to claim 4, characterized in that the polygonal portion of the end region (28) of the setting shaft (20) receiving the actuating knob (32) is square in cross-section.

6. Printing mechanism according to claim 4, including a connecting web (98) between a free end of each detent finger which is at an opposite end from the connection of the inner sleeve to an end wall of the actuating knob (96) and a point lying substantially in the centre of the longitudinal extent of the outer sleeve (82).

7. Printing mechanism according to any one of claims 4 to 6, characterized in that the inner cavity (88) of the inner sleeve (84) comprises in the region of the end wall (86) of the actuating knob (32) a constriction (90) of circular cross-section, that the setting shaft (20) comprises directly at the end a bead (68) and therebehind a peripheral groove (70), the diameter of the bead (68) being greater than the inner diameter of the inner cavity (88) in the region of the constriction (90) and the diameter of the groove (70) being equal to said inner diameter, and that the setting shaft (20) comprises in the end region (28) carrying the actuating knob (32) a diametrically extending slot (72).

8. Printing mechanism according to claim 2, characterized in that the detent elements are axially extending detent fingers (144) which are disposed on the end region (128) of the setting shaft (140) carrying the actuating knob (132) and are in engagement with said shaped means comprising axial detent grooves (138) on an inner face wall (133) of the actuating knob (132) surrounding the setting shaft (140).

9. Printing mechanism according to claim 8, characterized in that the setting shaft (140) comprises at least in the end region (128) receiving the actuating knob (132) an axial passage (143) and that in the wall (141) of the setting shaft (140) surrounding the axial passage (143) axially extending slots (142) are disposed for forming the detent fingers (144).

10. Printing mechanism according to claim 8 or 9, characterized in that in addition to the detent fingers (144) on the setting shaft (140) resilient locking hooks (146) are provided which prevent an axial displacement of the actuating knob (132) to engage into a circumferentially extending groove (150) in the inner face of the wall (133) of the actuating knob (132) surrounding the setting shaft (140).

11. A printing mechanism comprising:
a plurality of type carriers carrying printing types in one peripheral region and indicator type in another peripheral region, the printing types are brought into a printing position by turning the type carriers;
a setting means including an actuating knob, a setting shaft operably connected to said actuating knob and a driver means for turning the type carriers in response to turning of said setting shaft, said setting means being axially displaceable to be brought into a drive connection with each of the type carriers for rotation therewith;
stop means provided at the type carriers for limiting the turning travel of the type carriers;
said actuating knob of said setting means is mounted at one end of said setting shaft which extends axially through central openings in the type carriers and at the other end of which a driver support is connected by way of a torque limiting means which permits said setting shaft to rotate relative to said driver support when the torque necessary to turn a type carrier is greater than a predetermined slip torque, but provides a direct connection below said predetermined slip torque, said torque limiting means comprising resilient detent elements operatively connected to one of said setting shaft and said driver support for engaging a shaped means on the other of said setting shaft and said driver support, said predetermined slip torque is governed by the spring hardness of said resilient detent elements and is greater than the force necessary to turn the type carriers and less than the force resulting from the effect of said stop means.

12. Printing mechanism according to claim 11, characterized in that the detent elements are detent fingers (180) which are disposed on the driver support (174) and which extend axially into a longitudinal passage (178) of the setting shaft (172) and are in engagement with said shaped means comprising axial detent grooves (182) in the inner peripheral face of the setting shaft (172) surrounding the longitudinal passage (178).

13. Printing mechanism according to claim 12, characterized in that on the driver support (174) in addition to the detent fingers (180) resilient locking hooks (184) are disposed which prevent an axial displacement of the driver support (174) relatively to the setting shaft (172) to engage into a circumferentially extending groove (186) in the inner peripheral face of the longitudinal passage (178) of the setting shaft (172).

* * * * *